United States Patent

[11] 3,572,676

| [72] | Inventor | Ming-Chih Yew<br>Utica, Mich. |
|---|---|---|
| [21] | Appl. No. | 785,946 |
| [22] | Filed | Dec. 23, 1968 |
| [45] | Patented | Mar. 30, 1971 |
| [73] | Assignee | General Motors Corporation<br>Detroit, Mich. |

[54] FLUID SPRING INCORPORATING FLUID MEDIUM CONSERVING FLOW CONTROL MEANS
12 Claims, 3 Drawing Figs.

| [52] | U.S. Cl. | 267/34,<br>267/65, 280/124 |
|---|---|---|
| [51] | Int. Cl. | B60g 17/04 |
| [50] | Field of Search | 280/124<br>(F), (LR); 267/34, 65 (B), (C), (D) |

[56] References Cited
UNITED STATES PATENTS

| 3,033,554 | 5/1962 | Francis | 267/34 |
|---|---|---|---|
| 3,106,387 | 10/1963 | Francis | 267/34 |
| 3,037,763 | 5/1962 | Greenwood | 267/65C |
| 3,036,180 | 5/1962 | Steinhagen | 267/65C |

*Primary Examiner*—Philip Goodman
*Attorneys*—W. E. Finken and D. L. Ellis

ABSTRACT: A fluid pressure energized auxiliary spring connected to a source of fluid pressure by conduit means having a height sensing flow control valve disposed therein which incorporates a pressure sensitive device operative to disable communication between the spring and atmosphere whenever the level of fluid pressure in the source is less than the level of fluid pressure in the spring irrespective of the operating position of the flow control valve.

Patented March 30, 1971  3,572,676

INVENTOR.
Ming-Chih Yew
BY W. F. Wagner
ATTORNEY

FLUID SPRING INCORPORATING FLUID MEDIUM CONSERVING FLOW CONTROL MEANS

This invention relates to fluid pressure energized springs incorporating means for conserving the fluid medium and more particularly, although not exclusively, to self-leveling vehicle suspension incorporating subambient fluid pressure energized springs.

An object of the invention is to provide an improved fluid pressure energized spring assembly and flow control means therefor.

Another object is to provide a device of the stated character in which a flow control valve connected between the spring and a source of vacuum moves from a closed position under normal static load conditions to an intake or an exhaust position responsive to compression or rebound deflection respectively, and including a pressure differential responsive device adapted to disable exhaust flow whenever the vacuum level at the source falls below the vacuum level in the spring.

Still another object is to provide an assembly of the stated character in which all of the operating elements are disposed interiorly of the spring.

A still further object is to provide an arrangement of the type described including externally accessible means for adjusting the flow control valve.

The foregoing and other objects, advantages and features of the invention will become more readily apparent as reference is had to the accompanying specification and drawing wherein.

Of the numerous fluid pressure energized springs disclosed in the prior art, those adapted to or intended for utilization in vehicle suspension commonly include fluid flow control means in the form of a leveling valve which is associated with the sprung and unsprung mass of the vehicle so that the flow control position of the valve accurately reflects any departure from normal displacement between the sprung and unsprung mass and either introduces or exhausts fluid from the spring to restore such displacement following any departure therefrom. Since this so-called leveling valve must cope with both static and dynamic conditions, it will be evident that in the case of the latter, normal excursion of the suspension resulting from the vehicle traversing irregular road surfaces causes constant alternating movement of the valve from its normally closed position to intake and exhaust positions, respectively, thereby producing a continuous intake and discharge of fluid pressure to and from the spring. In order to overcome such needless consumption of fluid medium, in the past it has been common to utilize leveling valves incorporating delay mechanisms of various types which enable a portion of the valve to respond to the suspension excursion without immediately opening the exhaust and intake ports in response thereto. In this way, transient excursions of the suspension do not in fact bring about needless introduction and exhausting of the fluid medium. Naturally, when sustained change in displacement between the sprung and unsprung mass occurs, as soon as the time delay interval has elapsed, the valve functions in its normal manner. While devices of the type described are very effective in accomplishing the objective, the delay feature necessarily represents a significant cost penalty and an added potential source of malfunction. In contrast, a construction in accordance with the present invention accomplishes the fluid medium conserving objective without resort to complicated and costly delay mechanisms, and due to its simplicity, minimizes the possibility of malfunction.

Figure 1:
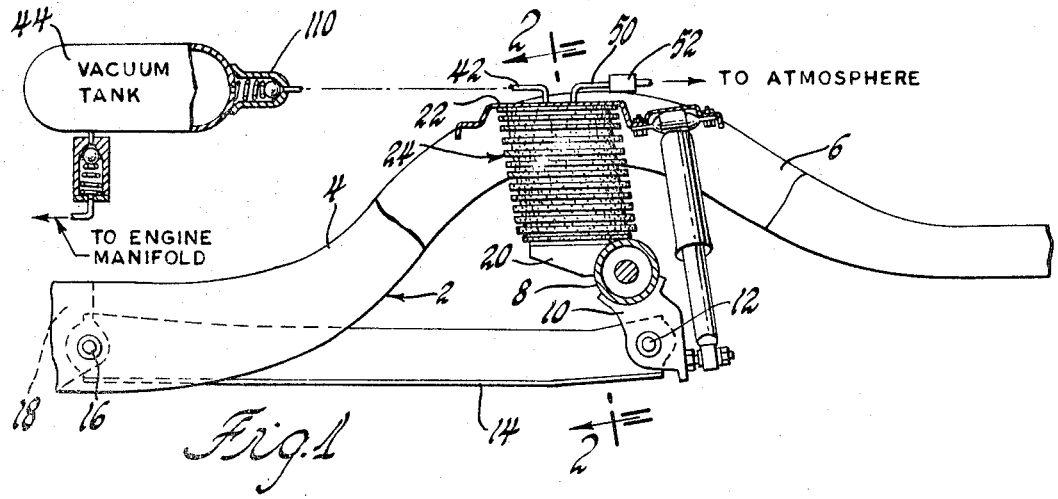
FIG. 1 is a fragmentary side elevational view of a portion of a vehicle rear suspension constructed in accordance with the invention.
Figure 2:
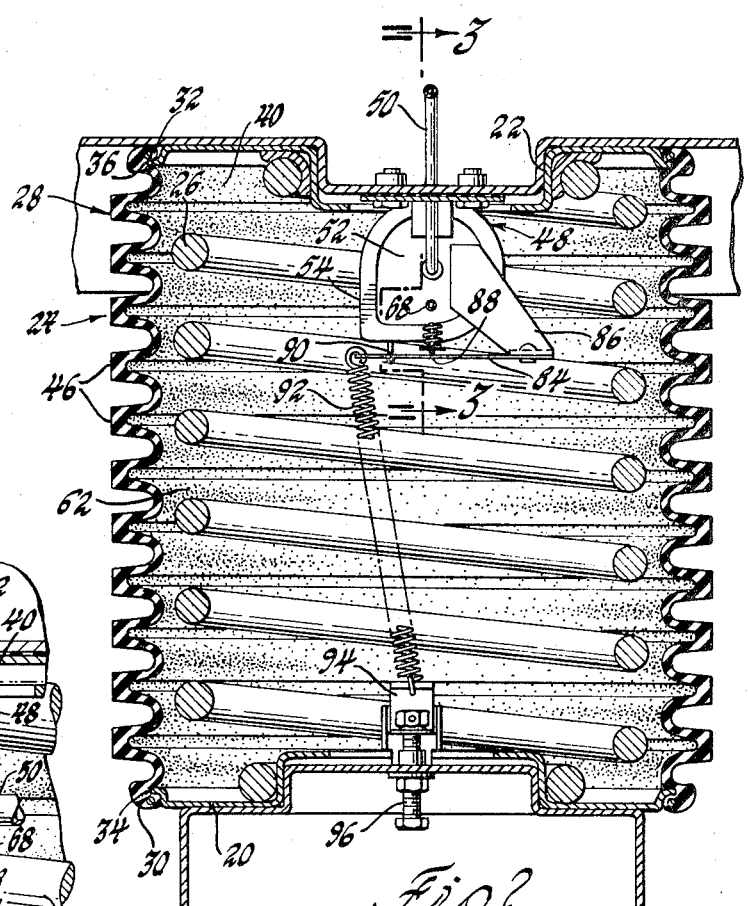
FIG. 2 is a greatly enlarged side elevational view, partly in section, illustrating the details of construction of the invention.

Referring now to the drawing and particularly FIG. 1, there is shown a vehicle suspension construction in accordance with the invention in which the reference numeral 2 generally designates the rear portion of a vehicle sprung mass which includes a frame side rail 4 having an upwardly arched portion 6 overlying a transversely extending rear axle 8. Secured to and depending from axle 8 is a bracket 10, the lower end of which is pivotally connected at 12 to the rearward end of a suspension control arm 14, the forward end of which is pivotally connected at 16 to a bracket 18 on side rail 2. Extending between a lower spring seat 20 on axle 8 and an upper spring seat 22 on arched portion 6 is a composite spring assembly 24 which, as seen best in FIG. 2, includes a primary coil spring 26 disposed concentrically within a bellowslike vertically flexible elastomeric sleeve 28 having opposite end portions 30 and 32 hermetically secured to the respective peripheral edges 34 and 36 of seats 20 and 22. In the illustrated embodiment, the primary suspension coil spring 26 is formed and calibrated to provide an elastic force capable of supporting the portion of the vehicle sprung mass adjacent thereto at a normal predetermined height above axle 8 when the sprung mass is supporting a normal passenger, cargo and fuel load complement. It will, therefore, be apparent that under less than normal load conditions, spring 26 will support the same portion of the vehicle at a level somewhat above the normal height. To maintain the vehicle at the desired normal height under such conditions, the interior 40 of sleeve 28 is subjected to subatmospheric pressure by connection therewith via conduit 42 to a vacuum tank 44 which in turn is connected to the intake manifold of the vehicle engine, not shown. To prevent radial inward collapse of sleeve 28 when subjected to such subatmospheric pressure, the bellowslike wall thereof is formed with a plurality of vertically spaced circumferential ribs 46 of enlarged cross section.

In order to regulate the level of subatmospheric pressure within sleeve 28 and thereby precisely maintain the vehicle in a level attitude, in accordance with the present invention a leveling valve assembly 48 is mounted on and depends downwardly from upper spring seat 22. Assembly 48 is connected in communicating relation with conduit 42 and with a conduit 50 which communicates with atmosphere via an air cleaner cartridge 52.

Figure 3:
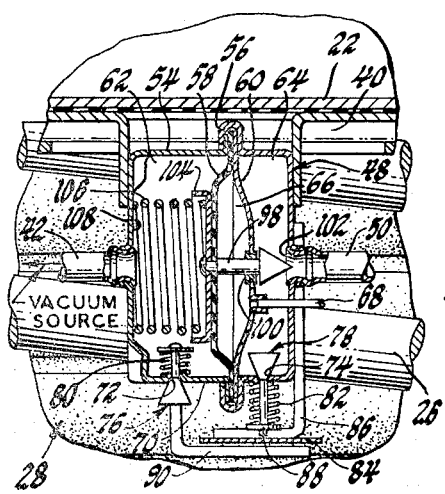
FIG. 3 is an enlarged sectional front elevational view looking in the direction of arrows 3-3 of FIG. 2.

As seen best in FIG. 3, leveling valve 48 includes a hollow sheet metal casing 54 having an intermediate crimped flange 56 which overlaps and secures the outer margins of a flexible diaphragm 58 and a sheet metal partition 60 disposed in axially aligned relation thereto. Partition 60 separates the interior of casing 54 into two chambers 62 and 64 while diaphragm 58 and partition 60 form a variable volume chamber 66 which is connected to the interior 40 of sleeve 28 by pipe 68. Chamber 62 is connected to conduit 42 and chamber 64 is connected to conduit 50. Formed in the lower wall 70 of casing 54 and communicating respectively with chambers 62 and 64 are a pair of tapered seat apertures 72 and 74 in which are reciprocably disposed a pair of Schrader-type valves 76 and 78. Valve 76 is normally biased upwardly to a closed position by a spring 80, while valve 78 is normally biased downwardly to a closed position by a coil spring 82. It will thus be evident that fluid flow between the interior 40 of sleeve 28 and chamber 62 of casing 54 is normally blocked by valve 76, while flow between the interior 40 and chamber 64 is normally blocked by valve 78. In order to regulate the positions of valves 76 and 78 in accordance with the desired flow path of the fluid medium, as seen best in FIG. 2 a blade spring element 84 is secured at one end thereof to a bracket 86 formed on casing 54 and extends laterally therefrom to pass beneath the lower end 88 of valve 78 and over a transversely bent portion 90 of valve 76. At its outer free extremity, blade 84 is connected to the upper end of a coil spring 92 which extends downwardly for connection at its lower end with a lug 94 vertically adjustably mounted on lower spring seat 20. Initially, blade 84 is installed with an upward bias sufficient to displace valve 78 from its seated position. Consequently, upon installation of spring 92, lug 94 is adjusted upwardly or downwardly by threaded adjustment member 96 until the midportion of blade 84 occupies a position vertically midway between the lower end 88 of valve 78 and the upper surface of transverse portion 90 of valve 76, when displacement between the vehicle sprung and unsprung mass is at the desired normal level. Naturally, when such displacement is reduced, tension on coil spring 92 is similarly reduced, allowing the blade 84 to deflect upwardly and unseat valve 78, permitting atmospheric air to enter through air cleaner 52 and pass through conduit 50 into the interior 40 of sleeve 28 thereby reducing the vacuum level therein and enabling the primary suspension coil spring 26 to raise the level of the sprung mass. Conversely, when the sprung mass is at a higher than normal level, the tension on coil spring 92 will increase sufficient to deflect blade 84 downwardly, causing it to displace valve 76 downwardly and thereby place the interior of the spring in communication with the vacuum tank via conduit 42. The increased level of vacuum thereby applied to the interior of sleeve 28 exerts an elastic force opposing coil spring 26 and lowers the level of the sprung mass until the blade 84 reaches its neutral position between valves 76 and 78 whereupon further fluid flow to or from the spring ceases.

In order to overcome needless expenditure of the vacuum medium when the vehicle suspension is subjected to transient deflections, according to the present invention the flexible diaphragm 58 in casing 54 carries centrally mounted stem 98 which extends through a fluidtight annular bearing 100 in partition 60 and is adapted for transverse movement into and out of blocking engagement with the opening 102 formed at the juncture of chamber 64 and conduit 50. Mounted on stem 98 at the opposite side of diaphragm 58 is a cuplike seat 104 in which is disposed one end of a coil spring 106, the opposite end of which engages the wall 108 of chamber 62. Spring 106 is calibrated so that stem 98 is displaced laterally into blocking engagement with the opening 102 whenever the vacuum level in conduit 42 and the vacuum tank 44 is less than the vacuum level in the interior 40 of sleeve 28. However, whenever the vacuum level in conduit 42 exceeds that contained in the interior 40, the pressure differential created across diaphragm 58 causes the latter to exert an opposing force exceeding that of spring 106 and thereby displaces the stem 98 from its blocking position in opening 102. It will thus be seen that under normal operating condition, i.e., when the vacuum level at the source is greater than within the spring, the valves 76 and 78 will respond normally to movements of blade 84 dictated by transient excursion of the sprung and unsprung mass to alternately introduce and exhaust subatmospheric pressure into and out of the interior 40 irrespective of whether such excursions are prolonged or rapid. However, in the event of vehicle operating conditions occurring wherein the vacuum level at the source diminishes below the level present in the spring, the pressure differential across diaphragm 58 will diminish accordingly, allowing spring 106 to displace the stem 98 to its blocking position. Thereafter, opening and closing movements of valve 78 responsive to suspension excursion will not permit reduction of the vacuum level in the spring and thereby prevent incremental rise in the sprung mass which would otherwise occur due to periodic additions of atmospheric air.

Since the leveling valve assembly responds to both compression and rebound deflection of transient nature, it is also possible, under conditions of low vacuum level in the source, for a reverse flow to occur when the valve 76 is open momentarily. Thus, during transient suspension excursion when the sprung mass rises above the normal level and valve 76 is momentarily opened, if the level of vacuum at the source is less than that within the spring, fluid flow into the spring could occur which would reduce the vacuum level therein and cause a similar incremental rise in the sprung mass over a protracted period. To eliminate this possibility in accordance with the present invention, a check valve assembly 110 is disposed at any convenient location in conduit 42 between the source of vacuum and the spring. Check valve 110 is biased so as to interrupt fluid flow in the direction of the spring, that is, whenever the vacuum level at the source is less than the vacuum level in the spring, no flow can occur. Naturally, as soon as normal vehicle operating conditions or resumption of a normal level of vacuum in tank 44 has been restored, normal fluid flow responding entirely to the relative positions of valves 76 and 78 resumes.

From the foregoing it will be seen that a greatly improved fluid energized self-leveling spring assembly has been devised which not only accurately establishes and maintains the desired vehicle trim, but additionally accomplishes this objective with optimum fluid medium economy. It is particularly important to note that when the subatmospheric pressure generated by engine operation serves directly as the source of such medium, ie., a direct connection to the engine manifold, conservation of such medium often becomes critical due to the considerable variation in vacuum potential which can be derived from the engine under either steady operation at turnpike speeds, or under normal operating conditions in which transient deflections of the suspension would otherwise impose an excessive fluid medium demand.

While but one embodiment of the invention has been shown and described, it will be apparent that other changes and modifications may be made therein. It is, therefore, to be understood that it is not intended to limit the invention to the embodiment shown.

I claim:

1. In a motor vehicle having a sprung and an unsprung mass, a spring seat formed on each mass, a coil spring disposed in compression between said seats, a vertically flexible sleeve disposed in concentric relation with said spring, means securing the opposite ends of said sleeve in fluidtight relation with the adjacent spring seats, a source of subatmospheric pressure, valve means operable from a neutral position responsive to opposite displacement of said sprung and unsprung masses to alternately effect communication between said sleeve and said source and said sleeve and atmosphere respectively, and means associated with said valve means effective irrespective of displacement of said sprung and unsprung mass to prevent communication with atmosphere when the level of subatmospheric pressure in said source is less than the level of subatmospheric pressure in said sleeve.

2. The invention of claim 1 wherein said spring is disposed within said sleeve and the latter is formed with axially spaced circumferential ribs effective to resist radial deformation.

3. The invention of claim 1 wherein said spring is disposed within said sleeve in radially spaced relation thereto, and the latter is formed with axially space circumferential ribs effective to resist radial deformation.

4. In a motor vehicle having a sprung and an unsprung mass, a spring seat formed on each mass, a coil spring disposed in compression between said seats, a vertically flexible radially stable sleeve disposed in concentric relation with said spring, means securing the opposite ends of said sleeve in fluidtight relation with the adjacent spring seats, a source of subatmospheric pressure, a valve assembly disposed on one of said spring seats extending into the interior of said sleeve and connected in communicating relation with said source and atmosphere, said valve assembly being movable upon opposite displacement of said sprung and unsprung mass from a neutral position to opposite operating positions alternately effecting communication between said sleeve and said source and said sleeve and atmosphere, means associated with said assembly for sensing pressure differential between said source and the interior of said sleeve, and means actuated by said last-mentioned means operable to disable communication between said spring and atmosphere irrespective of the operating position of said valve assembly when the vacuum level in said source is less than the vacuum level in said spring.

5. In a motor vehicle having a sprung and an unsprung mass, a spring seat formed on each mass, a coil spring disposed in compression between said seats, a vertically flexible radially stable sleeve disposed in concentric relation with said spring, means securing the opposite ends of said sleeve in fluidtight relation with the adjacent spring seats, a source of subatmospheric pressure, a valve assembly disposed on one of said spring seats extending into the interior of said sleeve and connected in communicating relation with said source and atmosphere, yieldable drive means operative upon opposite displacement of said sprung and unsprung mass to actuate said valve assembly from a neutral position to opposite operating positions alternately effecting communication between said sleeve and said source and said sleeve and atmosphere, means associated with said assembly for sensing pressure differential between said source and the interior of said sleeve, and means actuated by said last-mentioned means operable to disable communication between said spring and atmosphere irrespective of the operating position of said valve assembly when the vacuum level in said source is less than the vacuum level in said spring.

6. The invention of claim 5 wherein said valve assembly includes a housing formed with a pair of chambers communicating respectively with said source and atmosphere and having ports therein normally closed by oppositely biased valves, and further including a blade element alternately engageable with the respective valves to displace the same from their normally closed positions.

7. The invention of claim 6 wherein said housing includes a central rigid partition disposed in peripherally sealed relation with a flexible diaphragm forming a variable volume chamber connected in communicating relation with the interior of said sleeve, said flexible diaphragm having a plunger connected thereto reciprocably movable through a fluidtight bearing sleeve mounted in said partition.

8. The invention of claim 7 wherein said diaphragm is disposed in the chamber at the side of said partition which is in communication with said vacuum source and the chamber at the opposite side of said partition is formed with an atmosphere communicating opening aligned with said plunger.

9. The invention of claim 8 including a spring in said first-mentioned chamber arranged to yieldably urge said plunger into abutting engagement with said atmosphere communicating opening when the vacuum level in said first chamber is less than the vacuum level in the variable volume chamber formed between the diaphragm and partition.

10. The invention of claim 9 wherein both of said valves are disposed at one side of said blade.

11. The invention of claim 10 wherein said blade is a cantilever spring anchored at one end to said housing and oriented so as to normally bias one of said valves to open position.

12. The invention of claim 11 wherein said yieldable drive means is a coil spring having one end connected to the free end of said blade and the other end connected to the lower spring seat, said coil spring being adjustably tensioned to displace the blade to a neutral position between said valves when the sprung mass of the vehicle is at a predetermined height above the unsprung mass.